UNITED STATES PATENT OFFICE.

DANIEL M. LAMB, OF NEW YORK, N. Y.

MOTH AND WATER PROOFING COMPOUND.

SPECIFICATION forming part of Reissued Letters Patent No. 9,777, dated June 21, 1881.

Original No. 224,296, dated February 10, 1880., Application for reissue filed July 13, 1880.

*To all whom it may concern:*

Be it known that I, DANIEL M. LAMB, of the city, county, and State of New York, have invented a new and useful Compound for Treating Goods to Render them Water and Moth Proof or Repellent; and I hereby declare the following specification to be a full and clear description of the same.

The object of this invention is to prepare a compound adapted to be applied to various kinds and qualities of goods for the purpose of rendering them impervious to water or moisture and at the same time to render them indestructible by such vermin as moths.

The goods intended to be treated by this compound embrace every variety of textile fabrics, from the most delicate fabrics to the heaviest goods, such as carpets, tents, sails of vessels, &c., and the compound used is such that it may be applied to the most delicate shades or tints of ostrich-feathers or any other feathers or furs that claim the attention of the taxidermist, or any beautiful specimens, either in color or texture, that are intended to adorn the museum of the entomologist; and for all of these uses or any others where moisture or moths or similar vermin are to be excluded the compound hereinafter more fully described is equally as well adapted as to textile fabrics.

The nature and constituents of this compound are such that no delicacy of shade or coloring will be injured by the treatment therewith, but, on the contrary, the colors to which the compound shall be applied will become and remain more fixed and unfading, for the reason that humidity will be excluded from every pore and fiber of the article treated, and hence all incipient decay will be prevented.

The materials used for this purpose, the manner of compounding them, and the process of treating the goods are as follows:

I take any of the lighter hydrocarbons, such as naphtha, benzine, benzole, gasoline, &c., but only such as are of 70° gravity or over, and to every gallon of such oil I add from one-quarter of an ounce to one ounce of india-rubber, gutta-percha, milkweed gum, or any other similar hydrocarbon gum. This mixture may be prepared or compounded in any desired quantity, and it will preferably be made in a vessel similar to that used and known in coal-oil refineries as an "agitator." In this vessel the mixture, prepared as above described, will be allowed to remain until all of the gum shall have been dissolved, and to facilitate this part of the process the gum should first be cut up into small pieces. After the gum shall have been fully dissolved, to every gallon of this mixture I add about four pounds (more or less) of chloride of sodium or common salt, and immediately thereafter I add to the compound about four pounds (more or less) of sulphuric acid. This mixture should be allowed to stand quietly in the agitator or vessel in which it is mixed for about twenty-four hours, during which time the salt will be distributed over the bottom of the vessel, and the sulphuric acid, impinging directly upon the salt, will generate a gas the powerful bleaching qualities of which will thoroughly bleach and cure the india-rubber or other gum, as well as bleach and whiten the entire compound. The gas, set free in the manner above described, will rise through the mass of the mixture in the vessel and attack the mucilaginous portions of the compound and precipitate them to the bottom of the vessel. After this gaseous treatment shall have been continued for about twenty-four hours, one or more currents of air will be driven through the mass of the compound from a suitable air compressor or blower, the air being conducted from the blower or compressor to one or more points in the bottom of the vessel through suitable piping, the outlet end or ends of which will be submerged within the mass under treatment. The injected current of air will be continued until all, or nearly all, of the evolved gas shall have been driven off, and then the mixture will be thoroughly washed with clean water, adding for this purpose about five to ten gallons of water to each barrel of the compound, the blowing of air through the mixture being continued throughout the washing process.

A somewhat similar process of treatment by gas and air has been heretofore applied by me to the purification of crude oils. This process was set forth in a patent granted me in 1876, No. 183,401; but the whole process is materially modified as now applied by me in the production of a water and moth proofing compound.

In addition to the treatment of the mixture as above described, I add during the washing process a small quantity of caustic soda or ammonia to the mixture, so as to eliminate any remaining gas or impurity that may be in the mixture, as well as to deprive it of any unpleasant smell.

The washing of the mass having been completed, it will be allowed to remain quiet until it shall have been thoroughly settled, the time for this being, say, one hour, (more or less,) and after it shall have thoroughly settled the water and sediment will remain at the bottom of the vessel, where it may be drawn off, and the waterproofing and moth-killing compound will stand on top of the water, whence it may be drawn off and decanted for use or kept in the generating-vessel until wanted by closing the top of the said vessel tightly, so as to prevent loss by evaporation.

The foregoing treatment of the dissolved india-rubber or other gum while it is held in solution by means of the above-described gas will be such as to change the mass into an entirely new chemical compound, which will not decompose, as would a mere mechanical mixture of the india-rubber, &c., and the hydrocarbon solvent, at 32° Fahrenheit, and will not do so at 0 Fahrenheit, or even below that point, the precise degree being as yet undetermined. Neither is the precise chemical form of the compound yet determined with accuracy; but it is perfectly, or nearly perfectly, colorless, and is odorless, the bleaching effect produced by the gas formed by the mixture in the solution of chloride of sodium and sulphuric acid being of the most perfect character.

The process of treating goods by this compound will be as follows: A suitable tank or vessel fitted with a removable but tightly-sealing cover will be provided, and this vessel will be filled, or partly filled, with the compound fluid prepared as above described. The goods to be treated will then be immersed in this bath and the cover carefully put on and sealed, so as to prevent evaporation and loss, and the goods will be allowed to remain a sufficient length of time to become thoroughly saturated, the time required for this varying considerably, obviously for the reason that some goods are more porous than others, and this fact must be considered as well as the thickness of the goods under treatment; but from half an hour to one hour in the bath will be sufficient for most articles, though others may require more time.

In lieu of the bath the liquid compound may in some special cases be applied with a brush; but the treatment will always be by submergence in a bath wherever that mode is possible. After the bath or otherwise coating of the goods under treatment, all adhering moisture will be shaken or brushed off, and then the goods will be hung up to dry in a close room, which is to be kept at a tolerably high temperature—say, 85° to 100° Fahrenheit. After the goods shall have been thoroughly dried in this manner, they may be packed away for use or sale, as required.

Although this treatment fills the double purpose of rendering the goods water-proof and also moth-proof, still it may, of course, be readily used without any disadvantage where only one of the objects gained is desired.

Having described my invention, I claim—

1. The process herein described of preparing a water and moth proofing compound by treating a solution of the described hydrocarbon gum dissolved in any suitable light hydrocarbon solvent, and then submitting the solution so formed for about twenty-four hours (more or less) to the action of a gas formed by the union of chloride of sodium and sulphuric acid, and then immediately after such gaseous treatment submitting the compound to a powerful agitation of a current of air, whereby the remaining gas is driven from the compound, and then washing the compound with water and an alkaline solution, as and for the purpose set forth.

2. The water and moth proof compound consisting of the described hydrocarbon-gum dissolved in any suitable solvent or light hydrocarbon treated with gas formed by the union of chloride of sodium and sulphuric acid, and then freed from residual-acid gas and other vapors, and finally washed with water and alkalies, as herein set forth.

DANIEL M. LAMB.

Witnesses:
J. B. THURSTON,
CHAS. T. HOWELL.